United States Patent [19]

Govoni et al.

[11] Patent Number: 4,518,750
[45] Date of Patent: May 21, 1985

[54] FLUID BED REACTOR

[75] Inventors: Gabriele Govoni; Canzio Corazzari; Giovanni Di Stefano; Mauro Loconsolo, all of Ferrara, Italy

[73] Assignee: Montedison S.p.A., Milan, Italy

[21] Appl. No.: 473,553

[22] Filed: Mar. 9, 1983

[30] Foreign Application Priority Data

Mar. 10, 1982 [IT] Italy .................. 20062 A/82

[51] Int. Cl.³ .................. C08F 2/00; C08G 85/00
[52] U.S. Cl. .................. 526/68; 526/88; 526/351; 526/352; 422/131; 422/143; 422/311
[58] Field of Search .............. 422/143, 131, 311; 526/68, 88, 352

[56] References Cited

U.S. PATENT DOCUMENTS 2,611,685  9/1952  Yoder .................. 422/143
3,298,792  1/1967  Di Drusco .................. 526/351 X

FOREIGN PATENT DOCUMENTS 85610  8/1983  European Pat. Off. .......... 422/143

Primary Examiner—Joseph L. Schofer
Assistant Examiner—S. Babajko

[57] ABSTRACT

A fluid bed reactor, suited for recycling a fluidizing gas containing, in suspension, particles of solid material; comprising a gas distributor consisting of a double-coned body or of a series of concentrical cones provided on their lateral surfaces with ribs or fins forming gas inflow channels shaped in such a way and with such an inclination as to allow the passage of the solid particles entrained in the gas flow, and such as to hinder the outflow of the solid material that has been fluidized, when the flow of the gas is interrupted.

2 Claims, 6 Drawing Figures

FLUID BED REACTOR

THE PRIOR ART

To the skilled in the Art the importance that said distributing element has for the smooth and regular and correct working of the fluid bed is quite known.

In fact, from this element depends the taking place of the fluidization, the uniform distribution of the gas in the bed, with the absence of dead zones, the frequency and the dimensions (size) of the bubbles in the bed, with appreciable repercussions on the mixing of the solids and on the exchange of matter and heat inside the system.

For the greatest part of the applications it is necessary that the distributor shall ensure a uniform distribution of the gas; shall hinder the fall of solids below the distributor during its working as well as during interruptions and that it shall have such a shape as to minimize the losses of load and the damages due to erosion.

Many are the types of distributors that will ensure the above listed performances and which consist substantially of a plate provided with numerous small holes which will allow the passage of the gas but not that of the solid particles that form the fluid bed.

THE PRESENT INVENTION

The present invention provides a new device for the distribution of gases and vapors in fluidized beds of solid particles which, besides the previously specified characteristics, will have that of being perfectly traversable by the solids entrained in the gases and vapors that are re-cycled back into the bed.

Figure 1:
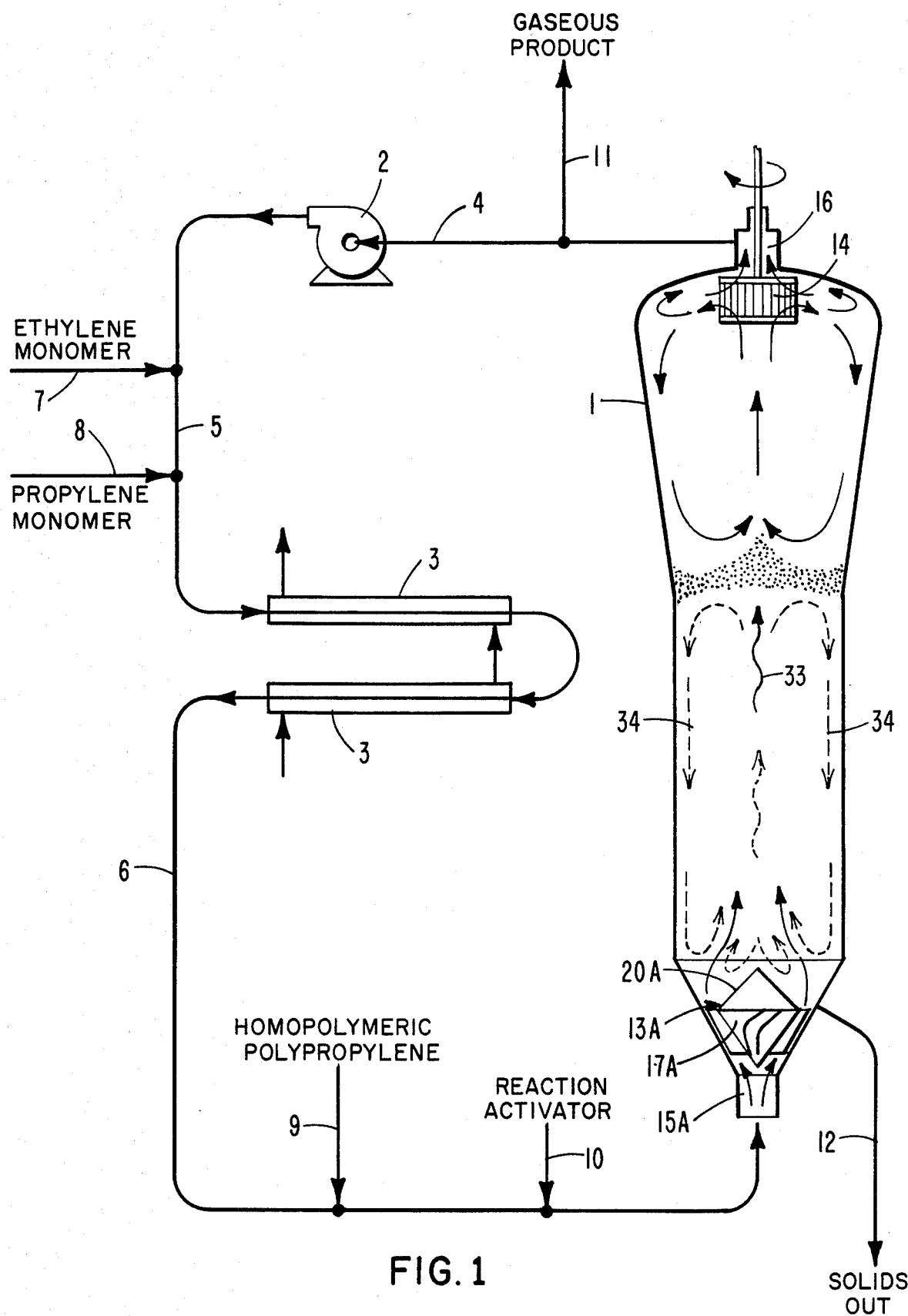
FIG. 1 is a schematic view of a fluid bed reactor according to the present invention, and the associated system for recycling the fluidizing gas.

The gas distributor 13 of this invention consists of two conically-shaped elements. The lower one, indicated in the figures as element 17, has its vertex pointing downwards and is provided with more than two, but preferably with from 6 to 24 ribs (element 18 in the figures), having such a profile as to form channels (grooves) 19 for the passage of fluids. The channels 19 decrease in width and depth from the vertex to the base of the conical element, causing the flow speed of the gas to gradually increase. The ribs of fins 18 forming these channels are arranged in an axial symmetry with respect to each other and are inclined with respect to the vertical axis in such a way that the particulate material of the fluid bed shall not descend out of said channels during interruption of the fluidizing process (suspension of the immission of gases).

Moreover, said inclination of the ribs imparts to the gas flow a tangential spiral component which will ensure a good distribution of the gas, avoiding the formation of dead zones in the reactor.

The upper conical element indicated as element 20 in the figures, with its vertex turned upward, has the function of activating the circulation of the solid in the fluid bed, in order to achieve in all points a good mixing through and a condition devoid of dead zones and stagnation. This conical element may also take the shape of a truncated cone and may be provided with a central duct for the discharge of the particulate material from the fluid bed.

Figure 4A:
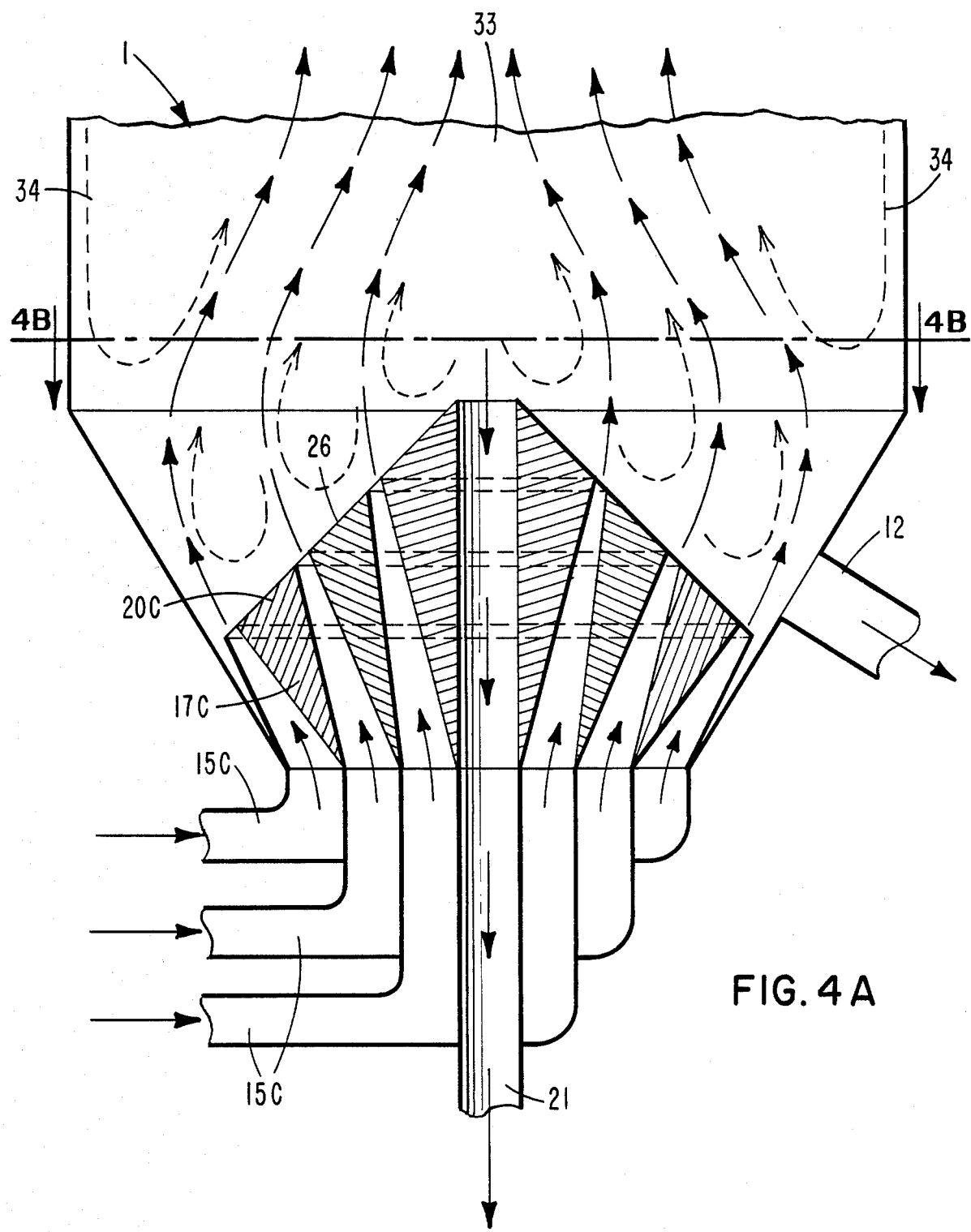
FIG. 4A is a vertical sectional view similar to FIG. 2A showing another modified gas distributor.

The distributor according to this invention may be also realized with a series of ribs arranged on concentrical cones as shown at 17C, in FIG. 4A.

Figure 5B:
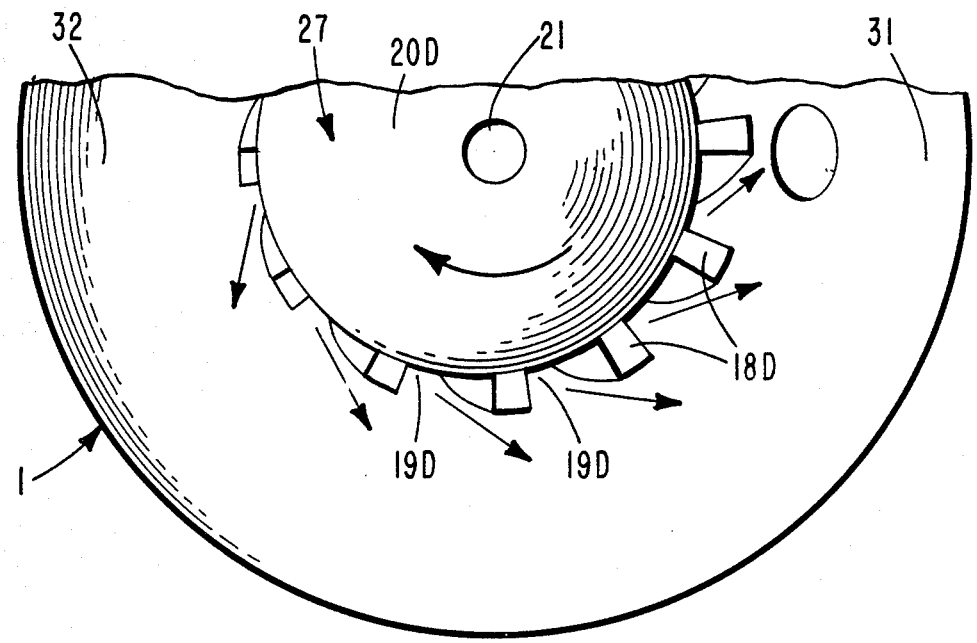
FIG. 5B is a sectional view taken along line 5B-5B of FIG. 5A.

It may also be realized as a rotating distributor 27, as indicated by FIG. 5, arranged with determined particular asymmetry that shall favor the passage of the gas preferably to a peripheral zone to the disadvantage of the diametrically opposite zone: this by having the distributor rotate at a suitable number of revolutions, preferably within a range of from 3 to 30 rev. p.min. (rpm). The gas will fluidize the bed in zone 31 and the solid will drop into zone 32, the position of said zones being continuously varied by the rotation of the distributor 27. The gas distributor 27 is rotated by a tubular shaft 29 which also serves as an axial discharge conduit 21.

Figure 2A:
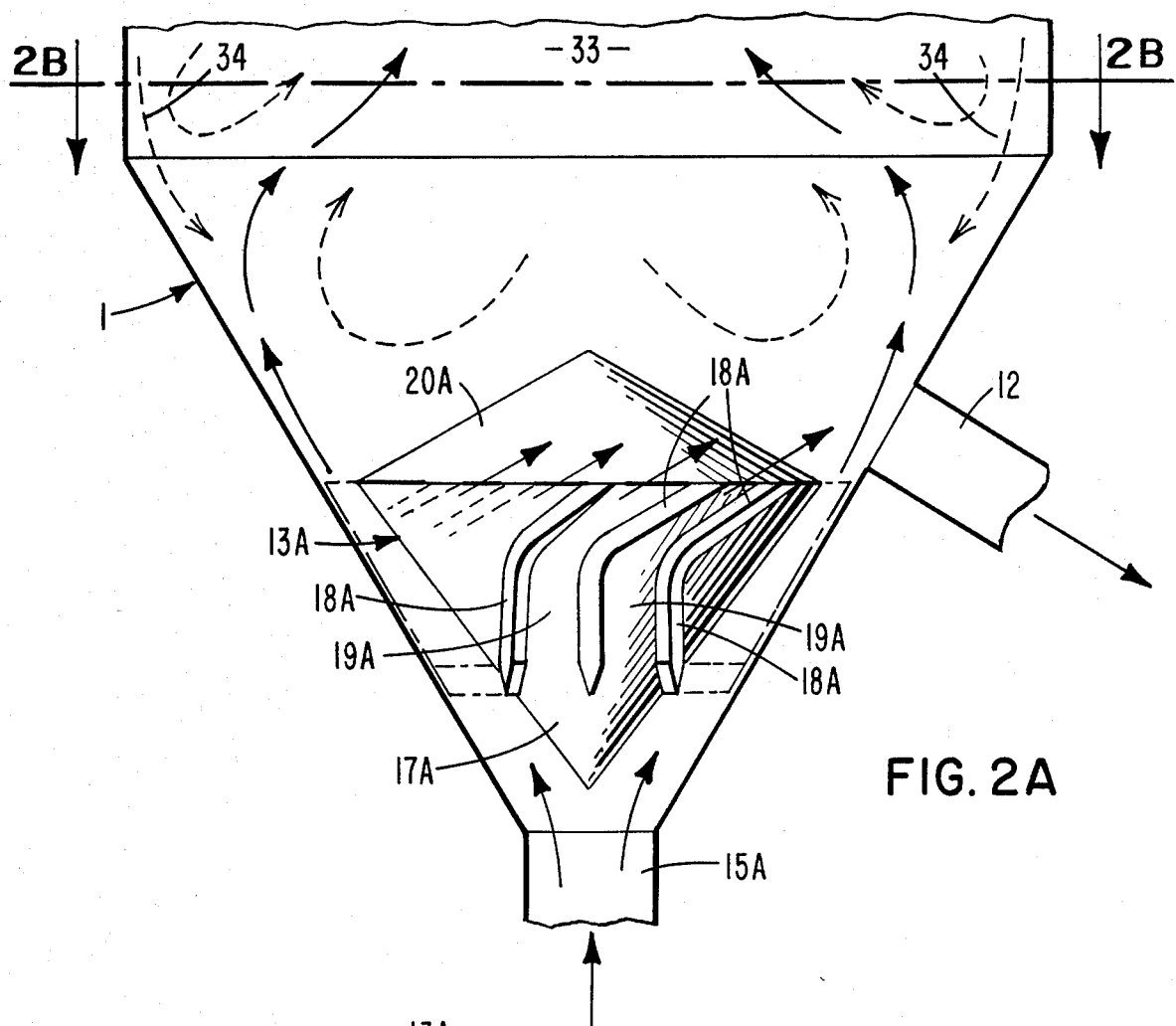
FIG. 2A is a vertical sectional view of the lower part of the reactor shown in FIG. 1; showing the gas distributor.
Figure 3:
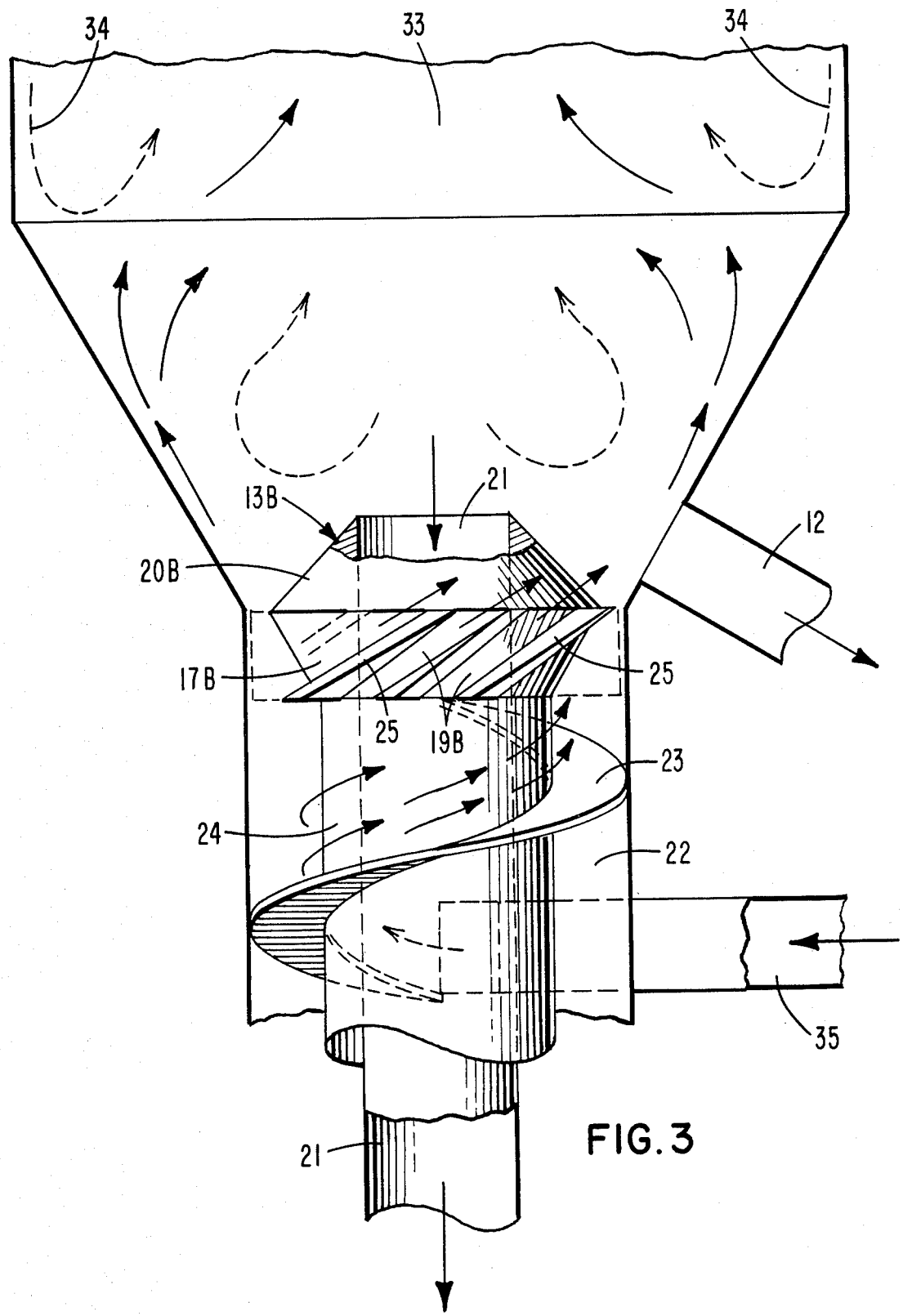
FIG. 3 is a vertical sectional view similar to FIG. 2A; showing a modified gas distributor.

The inflowing of the gas into the distributor may be axial as at 15A (Fig. 2A) or tangential as at 35 (Fig. 3). The solids may be discharged from the fluid bed through a lateral outlet conduit 12 or from the bottom of the reactor through axial discharge conduit 21. The distributor may also be supported axially by a rotating shaft for the control of possible internal scrapers intended for ensuring a mild stirring and the removal from the walls of possible agglomerations of solid.

The flow speed of the gas in the fluid bed must be equal to or greater than the speed of minimum fluidization, and preferably should be comprised between 2 and 50 times. At any rate, said speed is a function of the particular substance used and of the size and morphology of the solid particles.

In the case of a mechanically stirred bed, the velocity of the gas may be even lower than the minimum fluidization.

In any way there must be ensured an effective mixing through of the fluid bed in order to achieve a fast renewal in all points of the fluid bed itself.

As a result, with the distributor according to this invention, the flow rate of the solid determines a downward flow of the solid in the neighborhood of the walls of the reactor and an upward flow in correspondence with the central axis of the reactor.

Also with granular fluids of low flowability and with a high stickness it is possible to operate without meeting problems of pollution of the reactor or of an ineffective distribution of the gas.

In order to avoid that there occur soilings in the cylindrical and tronco-conical stretches of the reactor walls, two systems may be adopted.

The first, already described in U.S. Pat. No. 3,298,792, consists in providing a rotating blade revolving at a number of revolutions per minute greater than 1, but preferably comprised between 1 and 10, which shall exert a scraping action on the reactor walls in order to hinder the accumulation of layers of solid on the walls themselves.

This system has proved fully effective for a clean running.

The second system, which is based on the observation that an excellent descaling agent for the walls is the solid itself when it is kept under vigorous motion, consists in inserting in the upper zone of the reactor a rotating separator, which will generate a flow of solid which from the center will be violently pushed towards the wall of the reactor by centrifugal force, thereby exerting a cleaning action.

Such a rotating separator 14 is the object of published Italian pat. application No. 23,875 A/81 in the name of Montedison, S.p.A., and which corresponds to Luxembourg pat. No. 84,366, granted Apr. 13, 1983.

The aim of the cleaning of the internal surfaces of the reactor is attained in this particular case with a means that causes also a separation of the solids entrained in the outflowing gas 16.

As has already been said, this is not necessary because the gas distributor according to the invention has the peculiar characteristic that it may be traversed by the particles of the solid; however, the separation effect obtained may turn out to be advantageous when current 11 must be free of dust because of requirements of the process or because of anti-pollution limitations or other reasons.

The system illustrated in FIG. 1 is completed by the hereunder described apparatuses.

Exhaust fan 2 provides a flow rate of the gas and dust exhausted from the reactor through the recycling system of sufficiently high speeds (greater than 5 mt/sec., and preferably 10–40 mt/sec.), so as to hinder any sedimentation of the powder along conduit lines 4, 5 and 6, and to avoid possible clogging of the conduits due to the accumulation of solid substances. The heat exchangers 3, if necessary, should be of the pipe-in-pipe type. In heat exchangers 3, the gas and the powders moving through the conduits may be heated or cooled according to the requirements of the process; using as a fluid for the thermal exchange water, steam, oil or any other substance according to the exigencies of the specific case.

Said heating or cooling fluid flows through the external pipe, while the process gas flows through the internal pipe to which may be applied a series of longitudinal ribs (not shown) on the gas side, in order to facilitate the disposal or acquisition of heat.

If the quantity of heat involved requires the installation in parallel of a plurality of heat exchangers, they should be designed to allow a flow rate of the gas of more than 5 mt/sec., and preferably a rate comprised between 10 and 40 mt/sec.

In the case the process requires an addition of heat, this may be alternatively supplied by means of electrical heating elements suitably arranged.

The object of this invention is particularly enhanced in applications using a high pressure in the system.

In this case, in fact, thanks to the higher value of the density of the gases in circulation, there will be needed smaller sized apparatuses, higher values for thermal exchange coefficient, reduced transportation rates in the lines and a reduced fluidization in the bed and, in the case of reactions, there will be achieved improvements in the kinetics thanks to the increase in concentration of the reacting gases.

As already mentioned, for the satisfactory working of the system the gas flow through the system should have a flow speed greater than 5 mt/sec., preferably comprised between 10 and 40 mt/sec., in order to ensure an absolute reliability with respect to soiling and the avoidance of dead zones for the clogging of the dragged on solid.

Just for exemplifying and not limiting purposes, we wish to mention the use of the claimed equipment for reactions catalized by solid granular catalysts, with a gaseous product flowing out of conduit 11, preferably filtered or separated from the entrained solids.

Another case suggested as an example for the application of the equipment of this invention, is that of the polymerization in gaseous phase of linear alpha-olefins for the preparation of plastic polymers.

In this case one operates with solid and gaseous reactants continuously fed in and continuous discharge of a solid granular product.

As an important application of the apparatus object of the present invention there may be mentioned its use in the production of ethylene-propylene plastic copolymers of the type described in published Italian patent application No. 24,475A/81.

In this case the equipment consists of a circuit consisting of a reactor 1, a centrifugal compressor 2, a heat exchanger 3, connected together as indicated in FIG. 1.

Into this circuit are fed in the ethylene monomer 7, propylene monomers 8 and the possible reaction activator 10 and a homopolymeric polypropylene base 9 containing the catalyst, coming from a reaction in solution or in bulk or in a gaseous phase, after the possible separation of the diluent.

The homopolymerization stage produces for each catalyst particle the stereospecific matrix of polypropylene with an isotacticity greater than 90%, but preferably greater than 95%, in such a quantity as to make preferably up a 60–90% by weight of the end product.

Inside this matrix, in the copolymerization stage, there is produced and it distributes itself with extreme regularity a prevailingly amorphous copolymer having a composition falling within the range of 25–75% by weight and preferably the nearest possible to 50%, of ethylene, in proportion to the remaining 10–40% by weight of the end product. The end product will show a content in ethylene of up to 20% by weight.

The cited characteristics are quite indicative and at any rate the product referred to is described in detail in Italian patent application No. 24,475 A/81.

Reactor 1 was made to operate at a pressure comprised within the range of 2–40 Kg/sq.cm. and at a temperature comprised between 40° and 100° C. The dwell time of the polymer in the fluid polymerization bed turned out to be comprised between 0.5 and 4 hours, while the average composition ratio of the monomers in the gaseous phase, expressed as a ratio between the molar concentration of the ethylene and the sum of the molar concentrations of the ethylene and propylene, $C_2^-/C_2^-+C_3^-$, is preferably comprised within the range of 0.35–0.55. This parameter is at any rate bound to the quality of the copolymer to be produced and to the particular high-yield catalyst used in the reaction, and is controlled in order to grant the actual production of the desired copolymer.

For this purpose there are adjusted the flow rates of the fed in monomers 7 and 8 and of the drainage flow rate from circuit 11.

EXAMPLE

This example is based on tests on a pilot scale which were carried out in a continuous plant with an output capacity of 25 kg/hr of ethylene-propylene block copolymer. There was used a gaseous-phase copolymerization apparatus as schematically represented in FIG. 1, in which the gas distributor mounted on the bottom of the reactor was of the type illustrated in FIG. 2, with a lateral discharge for the product.

Figure 6:
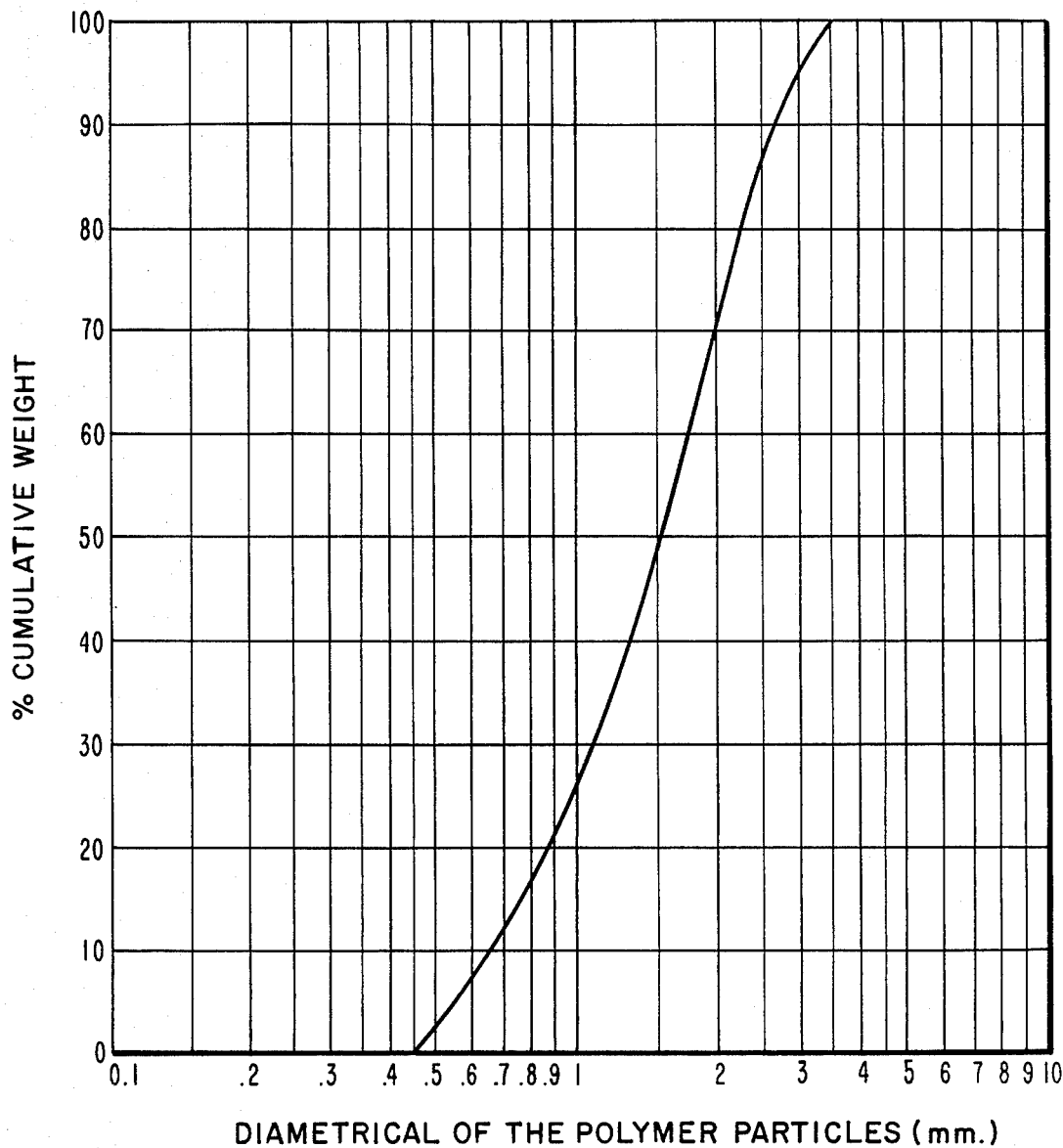
FIG. 6 is a graph of the granulometry of the polymer particles that may be used in the reactor.

The copolymeric base was produced according to a bi-stage process in a liquid monomer. There was employed a catalyst prepared according to example 1 of European Pat. No. 45,977, which allows to obtain the polymer in particles of a spherical shape and in a restricted granulometry, as shown in FIG. 6.

The polymer in suspension in a liquid monomer, was separated from the propylene by flashing in a cyclone and by then feeding it into a fluid bed reactor.

For the purpose was used a gaseous phase copolymerization reactor characterized by a fluidization rate equal to 45 cm/sec.

The circulation speed of the gas-polymer mixture circulating in the circuit of FIG. 1, amounted to 12 mt/sec. in stretch 4 and to 30 mt/sec. in stretches 5 and 6 and in exchanger 3.

The operational conditions of the example have been recorded on Table 1 wherein also the characteristics of the obtained copolymer are shown.

No soiling of the internal walls of the reactor nor clogs of compacted polymer were detected and there was achieved an excellent control over the fluidization without cloggings or deposits of polymer in the external circuit even after prolonged periods of operation of more than 1000 hours running.

TABLE 1

|  | UNIT |  |
|---|---|---|
| OPERATIONAL CONDITIONS |  |  |
| 1st STAGE: Homopolymer | — | — |
| temperature | °C. | 70 |
| pressure | Atm | equilibrium |
| Dwell time | hours | 1.3 |
| Melt flow rate "L" | g/10 min. | 1.82 |
| Isotacticity index | % | 96.7 |
| Yield | g. pol./g. CT | 16,500 |
| 2nd STAGE: Homopolymer | — | — |
| Temperature | °C. | 75 |
| Pressure | Atm | equilibrium |
| Dwell time | Hours | 1.3 |
| Melt flow rate "L" | g/10 min. | 1.55 |
| Isotacticity index | % | 97 |
| Yield | g. pol./g. CT | 28,500 |
| 3rd STAGE: Copolymer | — | — |
| Temperature | °C. | 70 |
| Pressure | Atm | 8 |
| Dwell time | Hours | 1 |
| Bound ethylene | % by weight | 10.9 |
| $C_2^-/(C_2^- + C_3^-)$ gaseous phase | mol/mol | 0.43 |
| CHARACTERISTICS OF THE END PRODUCT |  |  |
| Melt flow rate "L" | g/10 min. | 1.72 |
| Yield | g. pol/g. CT | 36,000 |
| Mean polymer diameter | micron | 1,500 |
| Fraction of polymer <500 micron | % | 2 |
| Apparent poured/compacted density | g/cc | 0.47/0.52 |
| Flowability | sec. | 16 |
| Flexural elasticity modulus | MPa | 1,200 |
| Transition Temperature (Ball Drop) | °C. | <−45 |
| Izod C.I. impact resistance at 23° C. | J/m | 380 |
| Izod C.I. impact resistance at 0° C. | J/m | 115 |
| Gloss | % | 45 |
| HDT (at 46 N/sq. cm) | °C. | 74 |

CAPTION: FIGS. 1, 2, 3, 4 and 5

Figure 2B:
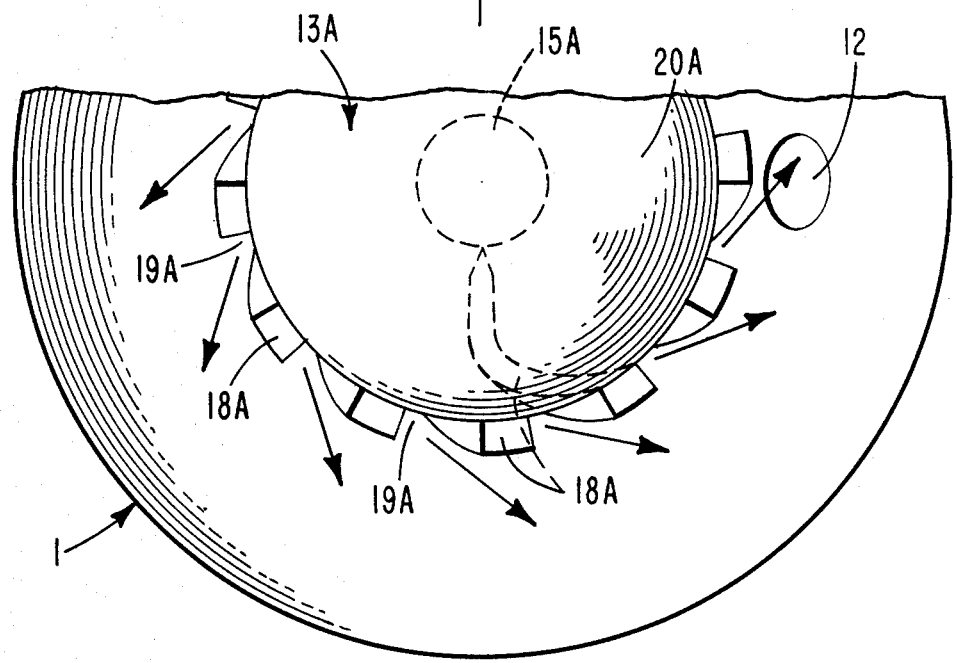
FIG. 2B is a sectional view taken along line 2B-2B of FIG. 2A.
Figure 4B:
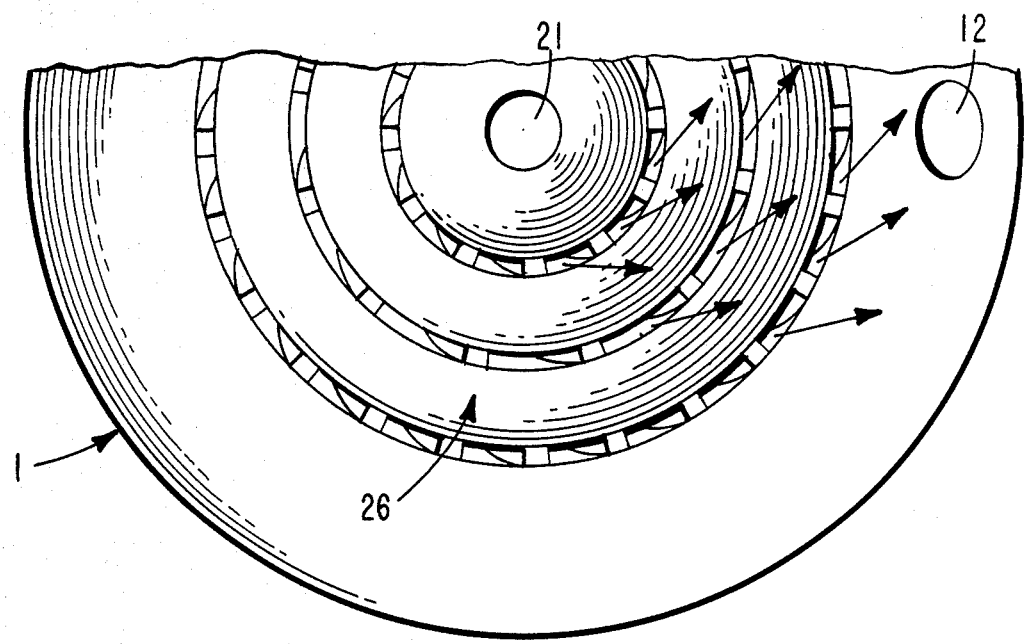
FIG. 4B is a sectional view taken along line 4B-4B of FIG. 4A.
Figure 5A:
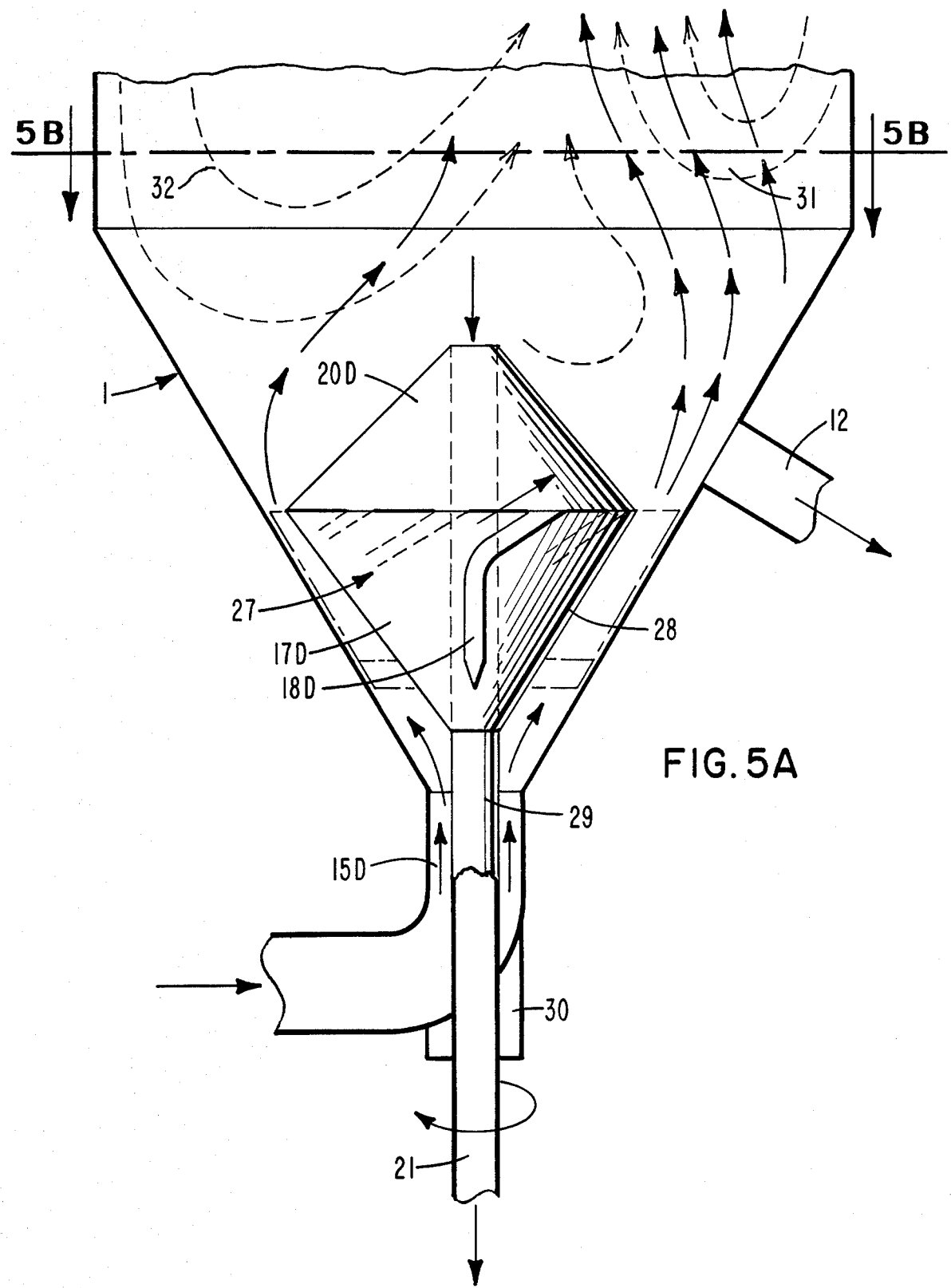
FIG. 5A shows another modified gas distributor.

1 = Fluid bed reactor;
2 = Centrifugal compressor for the recycling of the gas;
3 = Heat exchanger with lined pipe;
4 = Connecting conduit;
5 = Connecting conduit;
6 = Connecting conduit;
7 = Feed of ethylene monomer ($C_2°$);
8 = Feed of propylene monomer ($C_3°$);
9 = Feed of catalyst cotaining copolymer base;
10 = Feed of reaction activator;
11 = Recycling gas exhaust;
12 = Lateral discharge for polymer;
13A = Gas distributor for fluid beds crossable by polymer powder, FIGS. 1 and 2;
13B = Gas distributor for fluid beds crossable by polymer powder, FIG. 3;
13C = Gas distributor for fluid beds crossable by polymer powder, FIG. 4A;
14 = Centrifugal separator for polymer particles;
15A = Current flowing into reactor, with axial flow in FIGS. 1 and 2A;
15C = Multiple consentric axial currents in FIG. 4A;
15D = Axial current flowing around tubular shaft 29 in FIG. 5A;
16 = Current flowing out of reactor;
17 = Cone of distributor turned downwards;
18A = Slanting and warped conveying ribs, FIGS. 1 and 2;
18B = Slanting and warped conveying ribs, FIG. 3;
18C = Slanting and warped conveying ribs, FIG. 4;
18D = Slanting and warped conveying ribs, FIG. 5;
19A = Conveying channels with decreasing cross-section, FIG. 2;
19B = Conveying channels with decreasing cross-section, FIG. 2;
20 = Cone of distributor turned upwards;
21 = Axial discharge of polymer from bottom of reactor;
22 = Chamber with tangential inflow of current fed into the reactor;
23 = A spiral vane surrounding cylinder 24 in FIG. 3;
24 = Cylindrical body of distributor in FIG. 3;
25 = Slanting conveying ribs without warp in FIG. 3;
26 = Distributor with concentrical cones with a plurality of anular ribbed crowns in FIG. 4;
27 = Rotating distributor with asymmetrical conveying channels; FIG. 5;
28 = Side of rotating distributor with asymmetrical conveying channels with decreasing cross-section, FIG. 5A;
29 = Tubular shaft of rotating distributor in FIG. 5A;
30 = Packing gland for rotary shaft;
31 = Lateral fluidization zone of the polymer;
32 = Lateral polymer redropping zone;
33 = Zone of entrainment of the polymer along the axis of the apparatus;
34 = Zone of the downward flow of the polymer near the wall;
35 = Inflow of current into the reactor with tangential flow;

Note: Suffix letters for some ref. nos.:
A—FIGS. 1 and 2
B—FIG. 3
C—FIG. 4
D—FIG. 5

What we claim is:

1. Process for the polymerization and copolymerization of alpha-olefins in a gaseous phase, on a fluid bed conssiting of polymerized material containing a catalyst, characterized in that said process is carried out in a fluid bed reactor comprising a distributor of fluidization gases which comprises a double cone body consisting of:

(a) a lower conical element, arranged with the vertex turned downwards, provided with more than two ribs on the lateral surface, said ribs having such a profile as to form, together with the wall of the containing shell, flow channels with a decreasing cross-section in an upward direction so that the velocity of the gas will increase gradually and correspondingly, the ribs being arranged diametrically opposite to each other with an axial symmetry and with an inclination with respect to the vertical such as to impart to the inflowing gas current a tangential component, the profile and inclination of the ribs being such as to allow the passage of the solid particles entrained by the inflowing gas, and so as to hinder the falling back of the particles of the fluidized bed whenever the feeding in of the gas is interrupted; and of (b) an upper conical element, wth its vertex turned upwards, superimposed onto the lower conical element and having the function of activating the circulation of the solid in the fluidized bed, eliminating the dead or stagnation zones, said process being further characterized in that the distributor in the fluid bed reactor in which it is carried out comprises devices for recycling of the gas, which distributor and the recycling devices allow the passage of the solid particles of the fluidized material entrained by the recycling gas.

2. Process for the copolymerization of ethylene and propylene in a gaseous phase, on a fluid bed consisting of a polymerized material containing a catalyst, under such processing conditions as to obtain an amorphous copolymer, said process being characterized in that it is carried out in a fluid bed reactor comprising a distributor of fluidization gases which comprises a double cone body consisting of:

(a) a lower conical element, arranged with the vertex turned downwards, provided with more than two ribs on the lateral surface, said ribs having such a profile as to form, together with the wall of the containing shell, flow channels with a decreasing cross-section in an upward direction so that the velocity of the gas will increase gradually and correspondingly, the ribs being arranged diametrically opposite to each other with an axial symmetry and with an inclination with respect to the vertical such as to impart to the inflowing gas current a tangential component, the profile and inclination of the ribs being such as to allow the passage of the solid particles entrained by the inflowing gas, and so as to hinder the falling back of the particles of the fluidized bed whenever the feeding in of the gas is interrupted; and of (b) an upper conical element, with its vertex turned upwards, superimposed onto the lower conical element and having the function of activating the circulation of the solid in the fluidized bed, eliminating the dead or stagnation zones, said process being further characterized in that the distributor in the fluid bed reactor in which it is carried out comprises devices for recycling of the gas, which distributor and the recycling devices allow the passage of the solid particles of the fluidized material entrained by the recycling gas.

* * * * *